United States Patent [19]

Dodd

[11] 3,969,249
[45] July 13, 1976

[54] SOLIDS REMOVER FOR HIGH RATE ALGAE PONDS

[76] Inventor: Joseph C. Dodd, 117 Powell Drive, Werribee, Victoria 3030, Australia

[22] Filed: Apr. 9, 1975

[21] Appl. No.: 566,239

[52] U.S. Cl. ............................. 210/170; 210/527
[51] Int. Cl.² ........................................ F02B 15/04
[58] Field of Search ........... 210/242, 527, 530, 170; 261/92

[56] References Cited
UNITED STATES PATENTS

| | | | |
|---|---|---|---|
| 1,203,578 | 11/1916 | Brooks | 210/242 X |
| 3,396,102 | 8/1968 | Forrest | 210/527 X |
| 3,526,591 | 9/1970 | Hampton | 210/527 X |
| 3,669,271 | 6/1972 | McGiven | 210/527 X |
| 3,807,560 | 4/1974 | Pentz et al. | 210/527 |
| 3,822,788 | 7/1974 | Dunkers | 210/527 X |
| 3,855,370 | 12/1974 | Dodd | 261/92 |

OTHER PUBLICATIONS

Paper: Evaluation of Techniques for Algae Removal from Wastewater Stabilization Ponds, by E. Joe Middlebrooks et al.; Utah Water Research Laboratory, College of Engineering, Utah State University, Logan, Utah, Jan., 1974.

Primary Examiner—Theodore A. Granger
Attorney, Agent, or Firm—Lothrop & West

[57] ABSTRACT

A solids remover for high rate algae ponds has a longitudinally extending pond within which there is a transversely extending settling basin, the settling basin having separate zones for the settlement of different solids. A carriage is supported for movement across the settling basin and carries pumping means. A nozzle arrangement on the inlet to the pumping means is effective to retrieve solids from any one or more of the separate zones and discharges the retrieved solids to a stationary solids receiver in any position of the carriage.

6 Claims, 5 Drawing Figures

SOLIDS REMOVER FOR HIGH RATE ALGAE PONDS

In my earlier U.S. Pat. No. 3,855,370 there is disclosed an algae pond arrangement for the culture of algae and some bacterial solids. In the culture of such items, especially in relatively large, outdoor ponds, there is a requirement for relatively strict supervision in order that the growing materials can be cultured in a most advantageous fashion having to do with specified algal growth particularly, and having to do with the maintenance of relatively favorable conditions despite variations in the atmosphere, seasons of the year, and the like. There is likewise a requirement for careful harvesting of the product of the culture medium so that an effective product can be obtained economically.

It is therefore an object of the invention to provide a high rate algae pond with a means for removing from the pond from time to time or as desired the wanted or unwanted products of the culture.

Another object of the invention is to provide a structure for removing effectively materials deposited in a high rate pond for culturing algae and the like.

Another object of the invention is to provide a removal means for high rate algae ponds in which a selection may be made of the materials removed.

A further object of the invention is in general to provide an improved means for removing solids from a high rate algae pond.

Other objects, together with the foregoing, are attained in the embodiment of the invention described in the accompanying description and illustrated in the accompanying drawings, in which.

Figure 1:
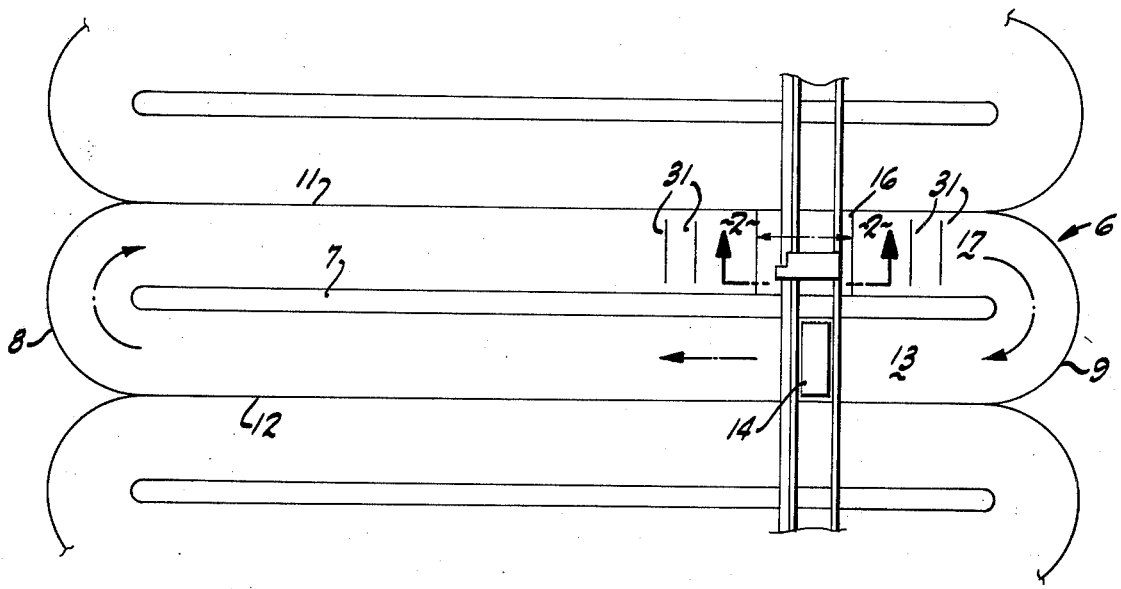
FIG. 1 is a plan, with portions broken away, showing diagrammatically an installation of my solids remover in a group of high rate algae ponds.

High rate algae ponds operate on the principles of shallow depth and periodic circulation to maintain a dense algal biomass and full aerobic conditions. Bacterial solids also are present, and these are responsible for conversion of organic wastes in the pond to carbon dioxide and other metabolic end products, which can be assimilated by the algae when sufficient light is available to form new algal cells and provide oxygen, the latter being used in the bacterial respiration. The bacterial biomass normally represents only a small fraction of the total biomass and is present primarily in the form of large, agglomerated particles or flocs. Although both the bacterial floc and the large algal cells tend to settle to the shallow pond bottom in the absence of circulation, nevertheless a regime of mixing for about one-half hour every six hours is sufficient to maintain a healthy biomass with a high percentage of viable cells, the mass being quiescent between mixing cycles. It is necessary to control the organic loading and pond depth to suit the prevailing climatic conditions. Overloading or excessive depths may reduce the percentage of viable algal cells and the general health of the biomass. Also, if dead cells and bacterial floc are allowed progressively to accumulate in the pond, they tend to inhibit light penetration and reduce the quality of the harvested algae.

In order to provide for the recovery of settled algal cells and removal of excess bacterial floc, dead cells and inert material from high rate ponds, which materials would otherwise accumulate and interfere with pond operation and performance, there is provided a particular arrangement. As particularly shown in FIG. 1, there is afforded in an outdoor location an elongated, high rate pond 6 arranged generally along a central dividing bank 7 extending longitudinally, the pond being also defined by arcuate end banks 8 and 9 and side banks 11 and 12. The pond is thus somewhat elliptical in plan and in one run 13 is provided with a mixing device 14 that can be operated or energized periodically in order to serve as a way of maintaining the desired homogeneity of the pond contents.

Figure 2:
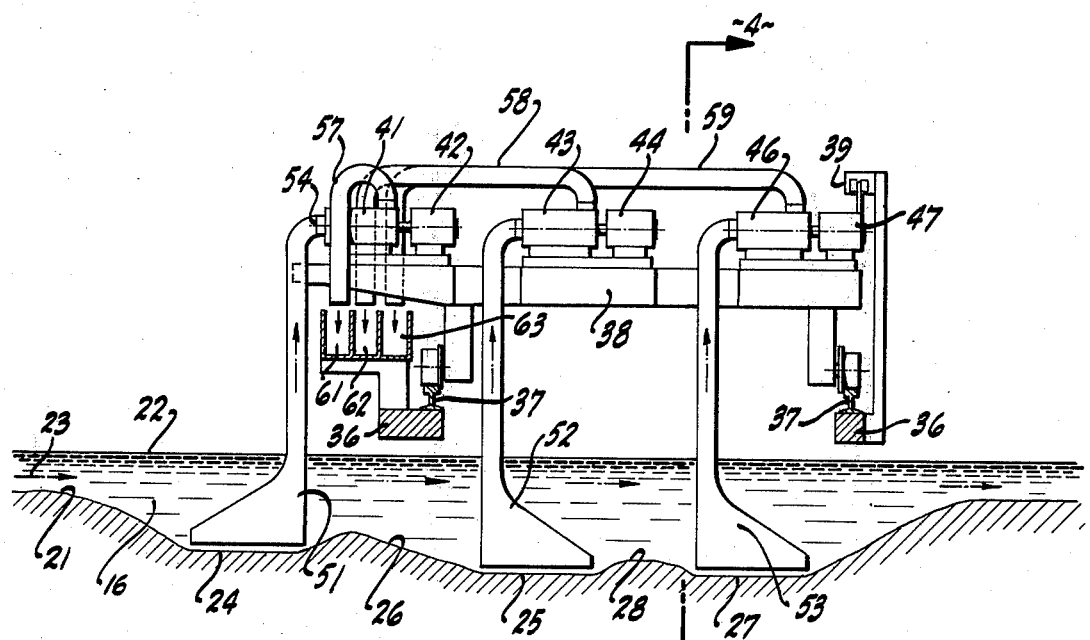
FIG. 2 is a cross-section, to an enlarged scale, through one of the ponds of FIG. 1, the plane of section being indicated by the line 2—2 of FIG. 1.
Figure 3:
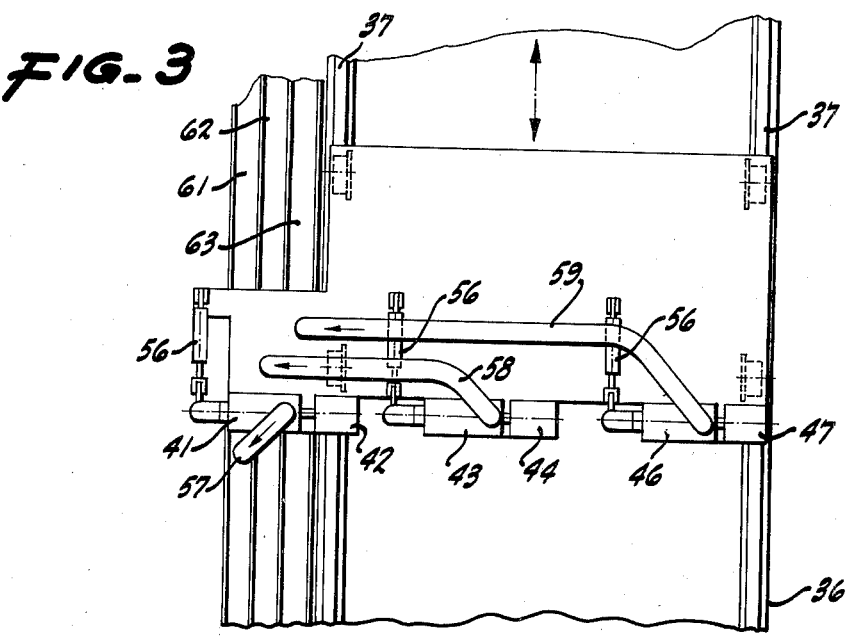
FIG. 3 is a plan of the structure shown in FIG. 2.

At a point in the pond remote from the installation of the mixing device 14, I preferably provide a settling basin 16 extending generally transversely of the pond run 17 and having a man-made bottom configuration substantially as shown in FIG. 2.

The normal pond bottom 21 is at a relatively shallow distance from the pond surface 22 throughout substantially the entire extent of the pond, but in the vicinity of the settling basin 16 is afforded a greater depth, extending generally downwardly in the direction of flow 23, to afford an initial zone 24 approximately level and of any desired width. Between the first zone 24 and a second zone 25 there is a pond bottom configuration 26 or submerged dam that is somewhat variable but preferably rises and then descends further. In addition, there is a third settling bottom 27 divided from the second zone 25 by a pond bottom configuration 28 having an initial rising portion and a following descending portion. After the third zone 27, the bottom configuration of the pond ascends gradually to resume substantially the same depth as before.

When the mixing device 14 is operated, there is an ensuing circulation of the materials in the pond in the direction of the arrow 23, and the larger materials tend to gravitate toward the bottom of the pond. The settling characteristics of the solids to be removed are sufficiently different under usual pond conditions to permit a useful degree of classification in the settling basin. Inert solids such as sand or silt from the pond bottom are much denser than the biological solids and hence tend to settle very quickly and are deposited or trapped for the most part in the first zone 24. In some instances, and should there be but little material of this sort in a particular pond, it is sometimes possible to omit the zone 24, but in most cases it is preferred to provide for a settling area or zone for heavy materials.

By virtue of their relatively large size, the bacterial flocs settle more readily than algal cells but less readily than sand or silt. The bacterial flocs tend to deposit in the central zone 25 and accumulate in that particular area, the raised portions 26 and 28 on either side of their settling zone tending to maintain the deposited or depositing materials relatively confined to their specific location.

The larger algal cells are trapped in the portion or area or zone 27 and are relatively well confined to that location. The smaller algal cells do not deposit in any of the indicated zones, but tend to travel along in the pond, passing through or over the settling basin, and tend to remain in suspension due to wind action and the like, even after the mechanical mixing step has stopped. They eventually pass out of the pond in a discharge to an algae harvester; for example, as disclosed in my U.S. Pat. No. 3,836,681, which is separate and distinct from the zones 24, 25 and 27.

In some instances, wave action due to incident wind may tend to agitate the materials in the vicinity of the settling basin to an excessive extent, and if that occurs then baffles or short covered sections on either side of the settling basin are provided. These are indicated by baffles 31 in FIG. 1.

For use in the time intervals between mixing cycles and when the pond is relatively quiescent, and when the deposited solids in the settling basin are generally immobile, I provide a removal arrangement particularly as shown in FIGS. 1–4 inclusive. In this case there is a superstructure 36 extending across the pond or across several adjacent ponds at a distance above the banks thereof and above the level of material therein. Rails 37 on the superstructure support a main carriage 38 for movement along the rails over one or more ponds, the carriage being suitably propelled by means, not shown, usually an electric motor supplied with electricity from a conductor 39. Rails 37 may also support a carriage used to transfer the mixing device 14 from one pond to the next as disclosed in U.S. Pat. No. 3,855,370, or separate rails and superstructure parallel to but removed from the rails 37 may be provided for the mixing device carriage to allow greater freedom of movement and operation.

On the carriage 38 there is a pumping means inclusive, in one form, of a primary pump 41 driven by an electric motor 42, a secondary pump 43 driven by its own motor 44, and a tertiary pump 46 driven by an individual motor 47. Each of the pumps has its own suction pipe 51, 52 and 53, respectively. Each pipe is connected to the inlet of its pump by a swivel joint 54. The lower end of each suction pipe is preferably enlarged in a longitudinal direction and is narrowed in a transverse direction to afford an appropriate induction nozzle. Alternatively, a plow or scraper attached to the suction pipe and directing the solids to the suction pipe inlet may be used. The pipe itself can be positioned in any one of several locations by means of a hydraulic jack mechanism 56 arranged so that the nozzle can extend generally downwardly toward but not in contact with the bottom of the pond and can be lifted high enough, as shown by the dotted lines in FIG. 4, to clear the banks of the pond when the carriage travels thereover. The other pipes, such as 52 and 53, are arranged in the same way as the pipe 51.

Each of the pumps 41, 43 and 46 has its own individual outlet pipe 57, 58 and 59 conveniently leading into an individual one of a plurality of discharge flumes 61, 62 and 63 mounted on the stationary framework 36 and leading to an appropriate discharge point or points, not shown. The control arrangement for the motors 42, 44 and 47 is such that the motors can be individually energized to operate but one pump at a time or, at the operator's choice, can be simultaneously energized so that any two or all three of the pumps can operate for cleanup. The motors may be of the variable speed type to permit changing the pumping rate to suit the amount of solids to be removed.

Figure 4:
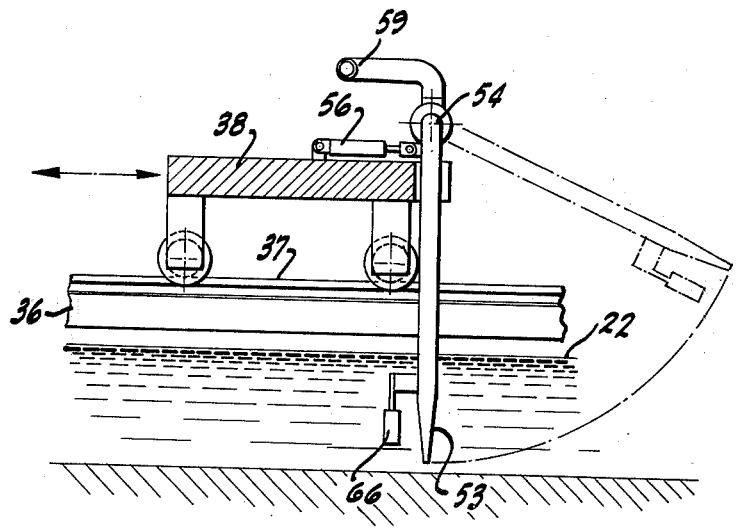
FIG. 4 is a cross-section, the plane of which is indicated by the line 4—4 of FIG. 2.

Each of the suction pipes, such as 51, 52 and 53, serves as an appropriate mounting for a sensor 66, as shown in FIG. 4. The sensor is a device, preferably of the ultrasonic type, capable of detecting the surface or depth of the settled solids in each of the various zones 24, 25 and 27, the aim being to sense the depths of the solids therein and to remove such solids before they become excessive. The sensor may also be used to control the pump motor so that the settled solids are removed but dilution caused by pumping after all the solids are removed does not occur.

In the usual operation, at a time intervening between successive mixing cycles and after a substantial deposit has been made in one or more of the various zones, the carriage 38 is moved along the rails 37 from a remote location to the location over the pond to be worked on and illustrated in the middle of FIG. 1. In traversing over the various banks of the successive ponds, the hydraulic chambers 56 are actuated so that the suction pipes are lifted along with the depth sensors to clear the banks readily.

When the carriage has arrived at a location over the settling basin and preferably at one end thereof; for example, near the central bank 7, the hydraulic mechanisms 56 are actuated to lower one or more of the suction pipes into position as shown in FIG. 2. The motor or motors are then energized to start the pumps, depending, if desired, upon signals from the sensors 66. For example, should the deposit in a particular zone be nil or less than requires removal, then the individual motor for that zone is not energized and its pump does not operate. On the other hand, should any one or more of the areas require removal, then the individual motors are energized, the pumps are operated. The carriage 38 is driven to make a slow traverse from a location near the central bank 7, for example, toward a margin bank 11. The deposited materials in each of the zones are separately lifted through the suction pipes and are discharged separately through the discharge pipes 57, 58 and 59 into the troughs or flumes 61, 62 and 63 and are separately removed from the high rate pond for disposal.

Following the mentioned removal operation, the pumps are deenergized, the nozzles or suction pipes 51, 52 and 53 are lifted by operation of the hydraulic cylinders 56, and the carriage is returned to its storage point or to an adjacent pond for a similar removal operation. In this way, the content of an individual high rate pond is maintained at a selected or desired value, and the deposited materials are moved from the pond in order to maintain optimum operating conditions and to recover the desired or undesired materials for disposal.

Figure 5:
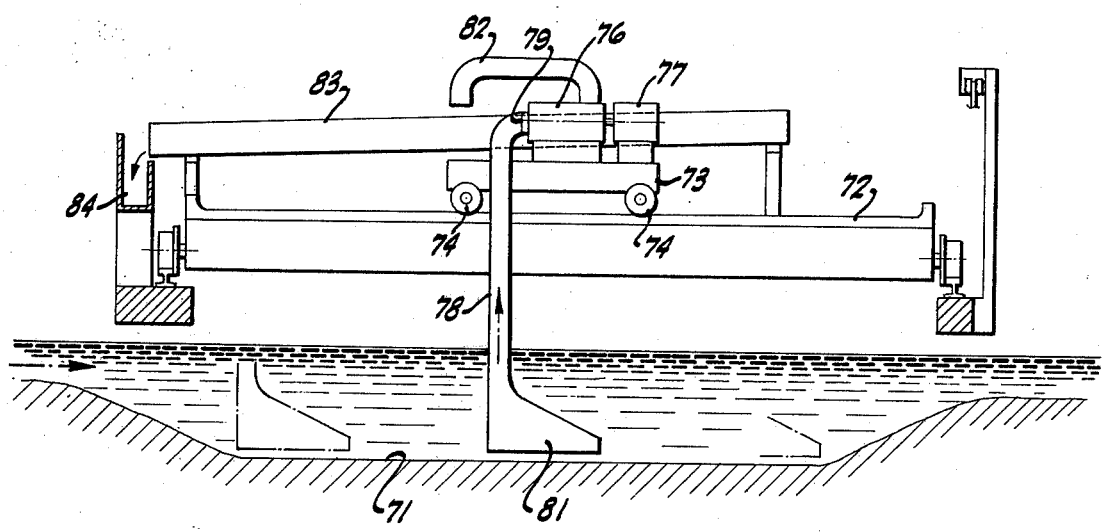
FIG. 5 is a view comparable to FIG. 2, but showing a modified form of removal device.

In some instances, the arrangement can be modified, as shown particularly in FIG. 5. The pond is substantially the same as before, except that in the settling basin 71 there is a uniformly depressed elevation of floor below the general level of the pond bottom. There is still provided on the rails 37 a carriage 38 receiving motive energy from the electrical power source 39 and movable from pond to pond transversely of the longitudinal extent of the pond. In this instance, however, the carriage 38 itself carries rails 72 extending longitudinally of the pond or transversely of the settling basin 71. On the rail 72 is a trolley 73 movable on wheels 74 from one end to the other of the rails under electric power. On the trolley is mounted a single pump 76 driven by an electric motor 77 receiving power as before. The pump has a single suction pipe 78 extending from a swivel joint 79 at the pump to a nozzle 81 at the bottom of the pipe near the floor of the settling basin. The pump 76 likewise is equipped with a discharge pipe 82 leading into a flume 83 on the carriage 38 and sloping downwardly to discharge into a trough 84 leading away from the system to a convenient point of discharge.

In this instance, when the settling basin has been substantially charged with deposited materials in various zones due to the different settling rates of the materials, the trolley 73 is put in one extreme position and the motor is energized to drive the pump 76. While in this instance there is no physical demarcation between the various deposit zones, there is nevertheless an opportunity to locate the nozzle 81 in separate zonal locations on the floor or near the floor of the settling basin and thus to remove the there-deposited solids. The main carriage 38 can be moved and the trolley can be positioned in three or more distinct locations to remove successively different deposits at various zones, in each case discharging into a single trough 84. The materials from the trough are successively discharged into different conveyors or containers for separate handling, if desired, or can be released in one location.

There is no need to operate the device in discrete zones only, since there can be a gradual traverse of the bottom of the settling pond. The nature of the effluent can be noted at the discharge of the trough 84 and appropriate disposal measures taken at that point. Nor is there any need to operate the nozzle in simply three zones. The nozzle can operate in but one zone or in a plurality of such zones. While there may be some intermixing of different kinds of deposited materials, the present arrangement is useful wherein some intermixing is of little or no consequence and it is advisable to utilize less pumping machinery and related equipment.

In the instances disclosed herein, there is afforded an arrangement by which materials can be separately deposited or classified in a settling basin incorporated in a high rate algae pond and in which the individually classified or separated deposited materials can easily be removed from time to time.

What is claimed is:

1. A solids remover for high rate algae ponds comprising banks forming an elongated pond having a bottom, means forming in said bottom a settling basin and physically defining in said basin a plurality of man-made zones longitudinally spaced apart axially along the length of said pond and said spaced apart zones having bottoms at different elevations for the settlement of different solids, a carriage, means for supporting said carriage for movement across said settling basin, pumping means on said carriage, a stationary solids receiving means extending across said settling basin, means for conducting discharge from said pumping means to said receiving means, and means for conducting solids from a selected one of said zones to said pumping means.

2. A device as in claim 1 including raised portions formed in said bottom transversely of said pond for separating said zones and in which said zones are arranged in sequence longitudinally of said pond for classification of said solids by their character.

3. A device as in claim 1 in which said forming means provided in the bottom of said pond include raised portions extending transversely of said pond to and between said banks, and said supporting means extends across said pond and said banks above said raised portions.

4. A device as in claim 1 including a similar pond alongside said pond and also having raised portions in the bottom thereof physically defining a similar settlement basin having different zones for the settlement of different solids in transverse alignment with said raised portions in said pond and in which said supporting means extends also across the settling basin in said similar pond.

5. A device as in claim 1 in which said different zones extend parallel to each other transversely of said pond and in which said means for conducting solids to said pumping means is selectively operable with but a selected one of said zones.

6. A device as in claim 5 including a plurality of nozzles in said means for conducting solids to said pumping means, said nozzles being arranged with respect to each other in a direction extending longitudinally of said pond and between said raised portions.

* * * * *